Figure 1:
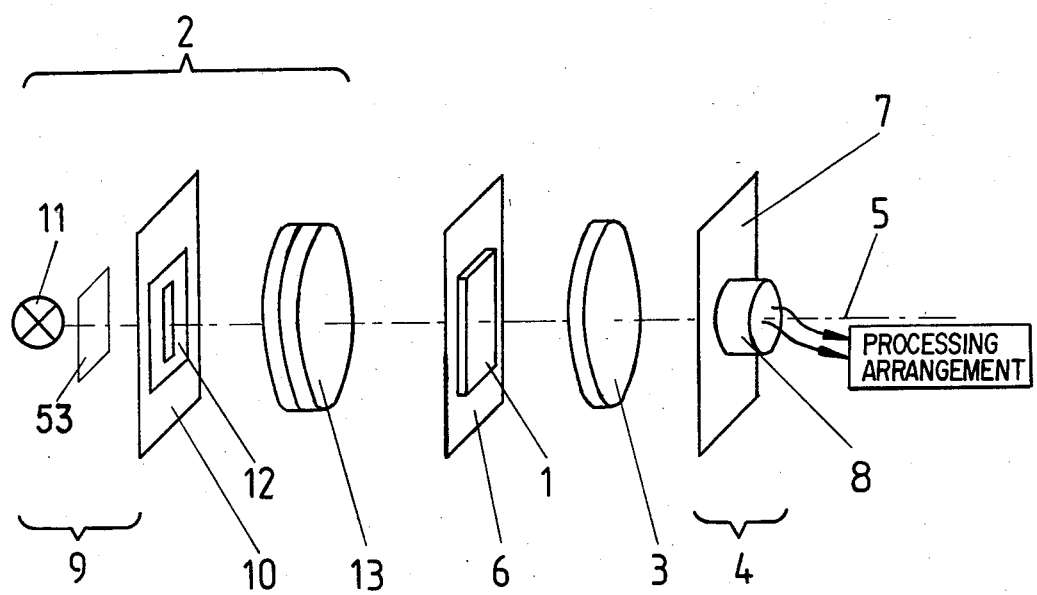

United States Patent [19]

Thorwirth et al.

[11] Patent Number: 4,735,487
[45] Date of Patent: Apr. 5, 1988

[54] OPTICAL APPARATUS FOR ANALYZING TWO-DIMENSIONAL INPUT OBJECTS

[75] Inventors: Günter Thorwirth; Detlef Biernat; Gerhard Kuehn, all of Jena, German Democratic Rep.

[73] Assignee: Jenoptik Jena GmbH, Jena, German Democratic Rep.

[21] Appl. No.: 797,349

[22] Filed: Nov. 12, 1985

[30] Foreign Application Priority Data

Dec. 29, 1984 [DD] German Democratic Rep. ... 272280

[51] Int. Cl.$^4$ ............................................. G02B 27/46
[52] U.S. Cl. .............................................. 350/162.12
[58] Field of Search ........................ 350/162.12, 162.14

[56] References Cited

U.S. PATENT DOCUMENTS 4,360,799 11/1982 Leighty et al. ................. 350/162.12

Primary Examiner—Bruce Y. Arnold
Attorney, Agent, or Firm—Jordan and Hamburg

[57] ABSTRACT

An apparatus for analyzing two-dimensional input objects comprising an illumination system including a lighting unit, a Fourier transform module and a receiver unit. The lighting unit generates an incoherent illuminating beam of predetermined form and area, for what purpose the lighting unit may include a self-luminous mask or an incoherently illuminated mask. A receiver unit comprises a single detector which is arranged in the optical axis of the Fourier transform plane of the Fourier transform module. The exit of the lighting unit is located on the optical axis and is imaged by the subsequent imaging optical elements (inclusive of the Fourier transform module) at the Fourier transform plane of the Fourier transform module.

9 Claims, 2 Drawing Sheets

OPTICAL APPARATUS FOR ANALYZING TWO-DIMENSIONAL INPUT OBJECTS

The present invention relates to an apparatus or arrangement for analyzing two-dimensional input objects.

The invention can be applied for evaluating and examining biological and medical preparations in the fields of biology and medicine as well as in biomedicine as a bordering field of the latter.

Especially in the field of medical device engineering the present invention can be utilized for analyzing cell samples and ascertaining abnormal cells, cancer cells or the like, or it can be applied in microscopy for the evaluation of microscopic images.

Other possibilities of application can be found in industrial robots engineering for controlling industrial robots, for quality control and workpiece positioning as well as in spectrometry for an effective analysis of spectra.

In the fields of biological and medical sciences information processing by means of optical image processing has gained an increasing importance. In image processing the coherent-optical Fourier transformation has proved to be particularly favourable.

The analysis of Fourier spectra obtained by means of coherent-optical Fourier transformation is an essential contribution to giving more objectivity and effectiveness to information extraction processes. The special properties of a Fourier spectrum are of particular advantage here. These properties facilitate the opportunity to gain the relevant information effectively and without the necessity to have the entire spatial frequency spectrum (Fourier spectrum) at one's disposal or to analyze said spectrum point-by-point completely. Due to the centrosymmetric structure of the spatial frequency spectrum it is sufficient for manyfold purposes to analyze, for example, only one half-plane of said spectrum. Hence, this way a method is provided to reduce the amount of data to be processed without any loss of information.

Spectral feature extraction by analysis of local spectrum regions of the Fourier spectrum has proved to be favourable. For this analysis, over a number of predetermined regions of the spatial frequency spectrum only one single integral value per region is determined and processed in the image evaluation unit.

Such types of arrangements for the analysis of local spectrum regions of cell and tissue samples are described by B. Pernick et al in APPL. OPT. 17 (1) 1978, 21 and R. P. Krüger et al in APPL. OPT. 16 (10) 1977, 2637. To transfer said arrangements into technical practice optoelectronic receiver arrays of special geometric design as, for example, Wedge-Detectors, Ring-Detectors or Wedge-Ring-Detectors are required. Disadvantageously, the detector arrays are elaborate and expensive since providing them requires special techniques.

To avoid such complicated detector arrays, in AVTO-METRIJA 1977 (5), 13 V. T. Davydov and E. S. Neshevenko have suggested an arrangement in which a simple detector can be employed but, on the other hand, a specially designed hologram in the form of rings or wedges is indispensable. Hence, this simply means replacing the problems in providing the detector by others in providing the hologram and the accessories required for the application of the latter (a rotating diaphragm, for example). A further technical solution is disclosed in the USSR patent specification No. 388279. In this case a special beam splitter hologram is employed and coupled with a number of subsequently connected single detectors. It is a disadvantage of this solution that, due to the application of a special beam splitter hologram and to the multitude of detectors required, there are also very great efforts for its realization to be made.

In addition to the disadvantages described above all solutions mentioned hereinbefore have one further and essential disadvantage. Coherent noise resulting from the optically coherent working procedure applied here, which occurs in addition to the various noise parameters of the individual detectors, makes it further more difficult to analyze local spectrum regions of an input object. The technical solutions known in the prior art which serve for suppressing or decreasing said coherent noise, for example those disclosed in the patent specifications GB No. 1409731, U.S. Pat. No. 3,482,102 and U.S. Pat. No. 3,977,771, also give rise to higher requirements and efforts, e.g., additional control equipment, complicated driving devices and translation units as well as special optical elements (for example tumbling glass plates) are indispensable.

Apart from coherent-optical image processing procedures, incoherent-optical solutions gained increasing importance in image processing. Solution variants especially for incoherent-optical Fourier transformation and for incoherent-optical filtering have been worked out—these are, for example, such arrangements as disclosed in the patent specifications GB No. 1281075, U.S. Pat. No. 3,288,018 and U.S. Pat. No. 3,390,257 which, unfortunately, require considerable and complex optics and additional specific elements.

Applying the analysis of local spectrum regions in an incoherent-optical working procedure requires great mathematic effort, concerning especially the heuristic methods, and, generally, to obtain useful results said analysis can only be used for one-dimensional input objects (Cartwright et al in Proc. of SPIE Vol. 422, N.Y. 1983).

It is an object of the present invention to obviate the above disadvantages.

It is a further object of the present invention to effectively analyze and evaluate information contained in two-dimensional input objects with a minimum of effort and with simple technical means.

It is another object of the present invention to provide a new optical working procedure for the analysis of local spectrum regions of spatial frequency spectra of two-dimensional input objects.

These and other objects are realised in an arrangement for analyzing two-dimensional input objects, said arrangement including an illumination system which is positioned on an optical axis in front of the input object and, subsequently positioned on said optical axis, including a Fourier transform module and a receiver unit with an evaluation system following, wherein the illumination system includes a lighting unit generating an incoherent illuminating beam of predetermined form and area given to the latter at the exit of the lighting unit. Said exit of the lighting unit is arranged on the optical axis and with respect to all subsequent optical imaging elements inclusive of the Fourier transform module in a position such to form the object plane for an image formation on the Fourier transform plane of the Fourier transform module. The receiver unit consists of a single detector arranged on the optical axis in the Fourier transform plane of the Fourier transform module.

Advantageously, the lighting unit may be an appropriate self-luminous mask corresponding to the predetermined form and area of the illuminating beam.

Moreover, it may be easily possible to assemble the lighting unit of an incoherent radiating source and a mask for determining the area and form of the illuminating beam. Preferably, the mask is an iris diaphragm or a switchable optical medium.

Another example of embodiment of the present invention may be a mask which is mounted in a mask supporting system provided as an alternating mask mechanism, which may include a number of additional masks. The alternating mask mechanism may be a turret of masks. To illuminate the mask evenly a ground glass screen may be arranged between the incoherent radiating source and the mask. Furthermore, if a monochromatic illuminating beam is required, it is possible to arrange a coloured filter within the illumination system so that the lighting unit has a monochromatic illuminating beam. According to the present invention, advantageously, it becomes possible to effectively analyze and evaluate information contained in two-dimensional input objects by applying simple means and minimum requirements. Due to the incoherent-optical working procedure it is an apparent advantage of the present invention that misinterpretations and additional effort for decreasing noise voltages occuring with a coherent-optical working method are avoided. The construction of the optical Fourier transform module does not require any special design and elements—it is feasible to adapt already available arrangements to the character of the invention without additional means. Another essential advantage of the present invention may be the possibility of providing an incoherent radiating source within the lighting unit. Hence, an application of laser systems, in every case being associated with the necessity of applying sensitive technical means and complex energy generating means, can be avoided.

Furthermore it is feasible to employ single detectors with a small receiving area. More complicated geometrical structures of the detectors are no longer required due to the new incoherent-optical method of analyzing local spectrum regions which is disclosed herein. Advantageously, the invention can be adapted to the relevant analysis problem to be solved by adapting form and area of the respective mask. Problems to be solved may include as well the recognition of determined details in the input object as, further more, an object classification. It is possible to detect the information of interest contained in a relevant object range with a high probability and in a simple and quick way.

Figure 2:
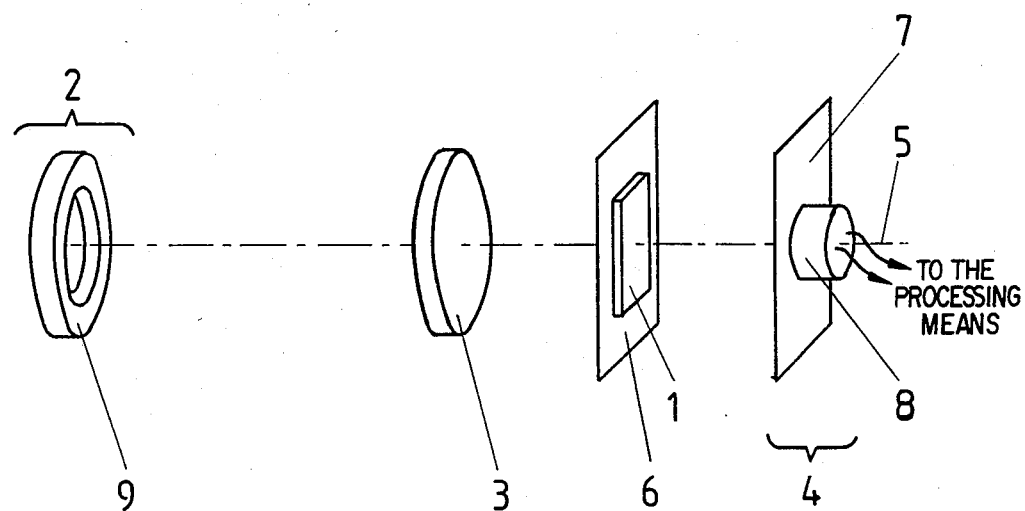
Figure 3:
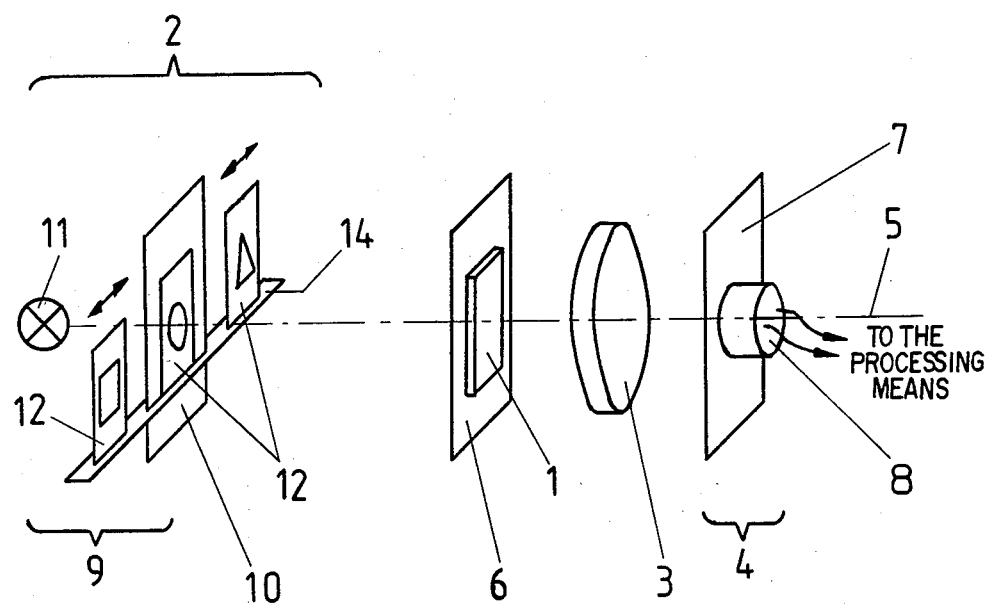

The present invention will now be described and illustrated further hereinafter, by way of examples of embodiment with reference to the accompanying drawings, in which:

FIG. 1—is an arrangement for analyzing two-dimensional input objects,

FIG. 2—is a further arrangement for analyzing two-dimensional input objects, the object plane of the Fourier transform module being arranged behind said Fourier transform module and a self-luminous mask being arranged as a lighting unit, FIG. 3—is another arrangement for analyzing two-dimensional input objects, said arrangement including an alternating mask mechanism, FIG. 4—the use of a colored filter, FIG. 5—the use of an iris diaphragm, and FIG. 6—the use of a turret.

According to FIG. 1 an arrangement for evaluating two-dimensional input objects 1 by analysis of local spectrum regions comprises an illumination system 2 arranged in front of the input object 1, a Fourier transform module 3, following the input object 1, and a receiver unit 4. The input object 1, the illumination system 2, the Fourier transform module 3 and the receiver unit 4 are arranged on an optical axis 5. The input object 1 to be illuminated by the illumination system 2 is disposed in the object plane 6 of the Fourier transform module 3. In the Fourier transform plane 7 of the Fourier transform module 3 a single detector 8 is arranged as a receiver unit 4 on the optical axis 5. The illumination system 2 comprises a lighting unit 9 with an incoherent illuminating beam (not shown in the present drawings) of predetermined form and area at the exit 10 of the lighting unit 9. Therefore, the lighting unit 9 has an incoherent radiating source 11 and a mask 12 for determining the form and area of the illuminating beam (not shown). Furthermore, the illumination system 2 comprises the imaging optics 13 including a number of optical imaging elements. The exit 10 of the lighting unit 9 is disposed on the optical axis 5 and with respect to all following optical imaging elements inclusive of the Fourier transform module 3 in a position such to form the object plane for an image formation on the Fourier transform plane 7 of the Fourier transform module 3. The present example of embodiment meets this condition since the mask 12 is arranged at the exit 10 of the lighting unit 9 and the mask 12 is imaged on the Fourier transform plane 7 by the imaging optics 13 operating jointly with the Fourier transform module 3. The exit 10 forms the object plane for all following optical imaging elements, e.g. for the imaging optics 13 and the Fourier transform module 3. The radiating source 11, which may be a source of incoherent light or a laser, may be realized in different ways of embodiment. It is feasible to use a filament lamp, a gas-discharge light source or a metal vapour lamp, a fluorescent lamp, a spectrum lamp or other incoherent source. To illuminate the mask 12 evenly it is useful to arrange a ground glass screen 53 between the radiating source 11 and the mask 12. In other variants of embodiment a coloured filter 50, as illustrated in FIG. 4, for example being arranged within the illumination system 2, permits operation with a monochromatic illuminating beam (not shown in the drawings), advantageously. Further, it is an obvious solution to provide instead of a source of incoherent radiation radiating source for the source 11 a laser system with a subsequent ground glass screen and, if necessary, a laser beam expanding system. Also in this case a monochromatic operating procedure can be used. In many cases it is desirable to provide as a mask 12 of the lighting unit 9 an iris diaphragm 51 as seen in FIG. 5, or an optical medium that is switchable corresponding to the form and area of the illuminating beam (not shown). The iris diaphragm and the switchable optical medium (not shown) are of further and special advantage since they permit a variation of the size of the area and the form of the illuminating beam (not shown).

The arrangement according to the invention operates as follows:

According to the operating procedure in evaluating input objects 1 by analysis of local spectrum regions of the spatial frequency spectrum of the input object 1 it is indispensable to obtain for an integration area of the spatial frequency spectrum, determined by the evaluation problem to be solved, a received integral value over said integration area and to record said value. Said integration area corresponds to a range of spatial frequencies within the optically generated spatial frequency spectrum. Since only one received integral value is obtained for each integration area, reducing the number of data to be processed is possible. Said integration areas can be disposed adjacently or overlapping one another, in dependence on the evaluation problem to be solved. Also, various integration areas being different in form and size can be selected one after the other and their relevant associated integral received value can be recorded then. By comparing a series of said received integral values to the received integral values of known object structures in analogous integration areas, object structures contained in the input object can be inferred from the differences or common properties existing between said values. This way, a large number of evaluation problems can be solved, including both object classification and, furthermore, object recognition. For example, by a procedure as described above a classification of cell and tissue samples can be performed and, as a result, it can be indicated, whether the samples contain abnormal cells in addition to normal cells. In case the received integral values of different integration areas over the cell samples's spatial frequency spectrum are compared to the received integral values of individual normal cells in the same integration areas of the spatial frequency spectrum, the quality of the sample can be judged in all probability. Said comparison permits useful information to be obtained due to the fact that normal cells have different spatial frequency spectra than, for instance, cancer cells. If the size and form of the integration areas are selected appropriately, as for example if sectors of a circle are selected, these mentioned differences between the spatial frequency spectrum of normal cells and that of abnormal cells can be shown clearly from the relevant received integral values. According to the present invention the illuminating beam (not shown) is determined in its area and form by the area and form of the mask 12 arranged at the exit 10 of the lighting unit 9. Said area and form correspond to that integration area of the spatial frequency spectrum over which the integral value of said spatial frequency spectrum has to be obtained, said area and form being determined by the relevant evaluation problem to be solved. With the input object 1 being illuminated by an incoherent illuminating beam (not shown), in the Fourier transform plane 7 on the optical axis 5 at (W=0) with an input function of the input object 1 of O(x,y) we obtain a received value to be recorded by the single detector 8 as follows:

$$I = [|\delta\{O(x,y)\}|^2 * R(w_x, w_y)]_{w=0},$$

provided that the mask 12 has a transmission function of $R(w_x, w_y)$. Said received value being $$I = \int_{-\infty}^{+\infty} R(w_x, w_y) \cdot |\delta\{O(x,y)\}|^2 \, dw_x dw_y.$$

This value being received by the single detector 8 is directly the integral value of the spatial frequency spectrum in the predetermined integration area. It is a advantageous feature of the present arrangement according to the invention that no spatial frequency spectrum itself is generated or obtained. In the optical axis 5 we achieve, directly, the desired received integral value which is essential in the further evaluation process. Hence, all efforts concerning the generation and a particular integration of the spatial frequency spectrum can be left out. Processing the achieved received integral values in the above described mannor may be carried out in a subsequentially arranged evaluation system (a computer), for example.

In FIG. 2 a further arrangement for analyzing two-dimensional input objects 1 is represented schematically. Arranging the individual elements is performed in a manner analogous to that of the arrangement described in respect to FIG. 1. It is a particular feature of this example of embodiment to arrange the object plane 6 of the Fourier transform module 3 along the path of the illuminating beam (not shown) behind the Fourier transform module 3. Another difference between FIG. 2 and FIG. 1 results from the different technical embodiment of the illumination system 2. Said illumination system 2 includes a lighting unit 9 which is formed of a self-luminous mask. The form and the area of said self-luminous mask correspond to those of the illuminating beam (not shown). It is located in a position to form the object plane for an image formation of the self-luminous mask on the Fourier transform plane 7 of the Fourier transform module 3, similarly as in the example described before. Imaging is performed by the Fourier transform module 3. The self-luminous mask as the lighting unit 9 can be realized by simply applying any incoherent radiating source with a relevant geometrical form of the radiating area—in the present example we selected an annular shape. Furthermore, it is preferable to design the lighting unit 9 in the form of said self-luminous mask such as to ensure the possibility of realizing various mask forms and areas by means of a relevant excitation of the lighting unit 9 in form of said mask. For example, this can be achieved by plurality of concentric rings which are driveable one after the other. However, other forms and areas than rings, for example various wedges, are applicable here as well and without any difficulties.

The operational mode of the arrangement according to the invention as represented in FIG. 2 is identical to that of the arrangement described in respect to FIG. 1.

In FIG. 3 a further example of embodiment of an arrangement for analyzing two-dimensional input objects is represented schematically. Also in this case the general set-up of the arrangement represented in FIG. 3 corresponds to that represented in FIG. 1. A special particularity of this variant of embodiment is, also in this case, that an image of the mask 12 arranged at the exit 10 of the lighting unit 9 is formed on the Fourier transform plane 7 by the Fourier transform module 3, as this has already been described with respect to FIG. 2. With an arrangement according to FIG. 3 the number of optical elements applied can be decreased to a minimum, and also the complex provisions and efforts for setting up said arrangement can be diminished.

As a further particular feature, the arrangement according to FIG. 3 is provided with an alternating mask mechanism 14 which includes a number of additional masks 12 of various forms and areas. These masks 12 are arranged in the alternating mask mechanism 14 in the form of a simple mask supporting system, what makes it easy to give the incoherent light beam (not shown) a number of various forms and areas alternately. Hence, it is possible to record a number of received integral values and to evaluate the input object 1 accordingly, as this has already been described with respect to FIG. 1. The openings of the masks 12 shown in FIG. 3 are examples of feasible variants, only. It is easily possible to provide masks of any type, also with an unsymmetrical opening. As well, one could substitute the alternating mask mechanism 14 by a turret of masks 52, as seen in FIG. 6, what results, hence, in a further constructional simplification of the alternating mask mechanism 14. As already explained with respect to FIG. 1, the indispensable condition to form an image of the relevantly used mask 12 on the Fourier transform plane 7 of the Fourier transform module 3 has to be fulfilled. In the example of embodiment according to FIG. 3 this image formation, as described hereinbefore, is performed by the optics of the Fourier transform module 3. The exit 10, e.g. the plane of masks, forms the object plane for said image formation. The operational mode of the arrangement according to FIG. 3 is equal to that described with respect to FIG. 1.

In all three cases of realization of the invention described here, a further variant of constructional design can be achieved. For several evaluation problems to be solved a monochromatic illuminating beam is required. This is also true, for example, if the input object forms an optical grating and the colour fringes which might occur are to be avoided. If a polychromatic radiating source is applied the monochromatic illuminating beam can be generated by using a coloured filter, as described with respect to FIG. 1. On the other hand, a coloured filter can be omitted and a Fourier transform module 3 which is specially corrected for chromatic aberration can be applied. Accordingly, said Fourier transform module 3 is chromatically overcorrected, what causes the lateral colours of the focal points to be compensated.

Therefore, what is claimed is:

1. An apparatus for analyzing two dimensional input objects comprising the following elements, which are successively arranged on an optical axis and are aligned with one another, comprising:
    an illumination system comprising a lighting unit with an exit and an incoherent illuminating beam of predetermined area and form at said exit;
    an input object to be analyzed;
    a Fourier transform module, with an input in the form of an object plane and an exit in the form of a Fourier transform plane, comprising optical means for performing an optical Fourier transformation of the input object to be analyzed, the input object being arranged in the object plane of the Fourier transform module and the result of the optical Fourier transformation being disposed in the Fourier transform plane;
    a receiver unit for recording the result of the optical Fourier transformation of the input object to be analyzed which unit is a single detector in the Fourier transform plane of the Fourier transform module on the optical axis;
    means for processing the result of the optical Fourier transformation recorded by said receiver unit and for outputting the result of the processing procedure;
    the exit of the lighting unit of the illumination system being located on the optical axis and with respect to all subsequent imaging optical elements inclusive of the Fourier transform module so as to form the object plane for an image formation on the Fourier transform plane of the Fourier transform module.

2. The apparatus of claim 1 in which said lighting unit has means for producing a monochromatic illuminating beam.

3. The apparatus of claim 1 in which said lighting unit comprises a self-luminous mask corresponding to the predetermined form and area of said illuminating beam.

4. The apparatus of claim 1 in which said lighting unit includes an incoherent radiating source and a mask for predetermining the form and area of said illuminating beam.

5. The apparatus of claim 4 in which a ground glass plate is arranged between said incoherent radiating source and said mask.

6. The apparatus of claim 4 in which said mask comprises an iris diaphragm.

7. The apparatus of claim 4 in which said mask is a switchable optical medium.

8. The apparatus of claim 4 in which said mask is arranged in a mask supporting system, said mask supporting system comprising an alternating mask mechanism including a plurality of further masks.

9. The apparatus of claim 8 in which said alternating mask mechanism is a turret of marks.

* * * * *